(12) United States Patent
Nocon et al.

(10) Patent No.: US 11,164,489 B2
(45) Date of Patent: Nov. 2, 2021

(54) ROTATIONAL BLUR-FREE IMAGE GENERATION

(71) Applicant: Disney Enterprises, Inc., Burbank, CA (US)

(72) Inventors: Nathan D. Nocon, Valencia, CA (US); Clifford Wong, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 299 days.

(21) Appl. No.: 16/516,873

(22) Filed: Jul. 19, 2019

(65) Prior Publication Data

US 2021/0020079 A1    Jan. 21, 2021

(51) Int. Cl.
*G09F 13/30*      (2006.01)
*G09F 19/02*      (2006.01)
(Continued)

(52) U.S. Cl.
CPC .......... *G09F 13/30* (2013.01); *G09F 13/0413* (2013.01); *G09F 13/16* (2013.01); *G09F 19/02* (2013.01); *G09G 3/005* (2013.01); *G03B 2205/0007* (2013.01); *G06T 2207/20201* (2013.01); *G09F 13/0431* (2021.05); *G09F 2013/189* (2013.01); *G09G 3/003* (2013.01);
(Continued)

(58) Field of Classification Search
CPC ............. G09F 13/0413; G09F 13/0431; G09F 2013/189; G09F 13/16; G09F 19/02; G09F 13/30
See application file for complete search history.

(56) References Cited

U.S. PATENT DOCUMENTS 4,687,167 A    8/1987   Skalka
4,943,851 A    7/1990   Lang
(Continued)

FOREIGN PATENT DOCUMENTS

JP    S58-154913 U    10/1983
JP    H1-280992 A    11/1989
(Continued)

OTHER PUBLICATIONS

Yasuhiro Suzuk, et al. "Research of Real World Life-Sized Video Avatar Presentation System," *Proceedings of the Virtual Reality Society of Japan Annual Conference 10*, Sep. 29, 2005, pp. 111-114.
(Continued)

*Primary Examiner* — Charles V Hicks
(74) *Attorney, Agent, or Firm* — Farjami & Farjami LLP.

(57) ABSTRACT

According to one implementation, an image generation system includes a rotor and a motor for spinning the rotor about an axis of rotation, and a display secured to the rotor. The display includes a display surface and a display aperture, a first privacy screen situated at the display surface and having a convex curvature relative to light emitted from the display surface, and a second privacy screen situated between the first privacy screen and the display aperture and having a concave curvature relative to light emitted from the display surface. The first privacy screen and the second privacy screen are configured to substantially prevent rotational blur of an image displayed by the display surface while the display is spun by the motor and the rotor.

20 Claims, 6 Drawing Sheets

(51) Int. Cl.
*G09F 13/16* (2006.01)
*G09F 13/04* (2006.01)
*G09G 3/00* (2006.01)
*G09F 13/18* (2006.01)

(52) U.S. Cl.
CPC . *G09G 2320/0257* (2013.01); *G09G 2358/00* (2013.01)

(56) References Cited

U.S. PATENT DOCUMENTS

| | | | |
|---|---|---|---|
| 5,057,827 | A | 10/1991 | Nobile |
| 5,148,310 | A | 9/1992 | Batchko |
| 5,239,892 | A | 8/1993 | Sakai |
| 5,437,235 | A | 8/1995 | Randolph |
| 5,714,997 | A | 2/1998 | Anderson |
| 5,815,314 | A | 9/1998 | Sudo |
| 6,115,006 | A | 9/2000 | Brotz |
| 6,183,088 | B1 | 2/2001 | LoRe |
| 6,208,318 | B1 | 3/2001 | Anderson |
| 6,481,851 | B1 | 11/2002 | McNelley |
| 6,801,185 | B2 | 10/2004 | Salley |
| 6,886,281 | B2 | 5/2005 | Smith |
| 7,002,604 | B1 | 2/2006 | Barrus |
| 7,477,252 | B2 | 1/2009 | Chun |
| 7,490,941 | B2 | 2/2009 | Mintz |
| 7,587,120 | B2 | 9/2009 | Koo |
| 7,708,640 | B2 | 5/2010 | Burak |
| 8,233,032 | B2 | 7/2012 | Yukich |
| 8,698,966 | B2 | 4/2014 | Liu |
| 9,053,660 | B2 | 6/2015 | Liu |
| 9,186,595 | B1 | 11/2015 | Cannon |
| 10,310,284 | B1 | 6/2019 | Waldron |
| 2001/0048405 | A1* | 12/2001 | Salley ............... G09F 13/22 345/30 |
| 2002/0148148 | A1 | 10/2002 | Smith |
| 2003/0142067 | A1 | 7/2003 | Kurtenbach |
| 2004/0082283 | A1 | 4/2004 | Lindell |
| 2004/0196362 | A1 | 10/2004 | Hoshino |
| 2005/0035962 | A1 | 2/2005 | Ishibashi |
| 2005/0083570 | A1 | 4/2005 | Ueda |
| 2005/0284997 | A1 | 12/2005 | Tisbo |
| 2006/0171008 | A1 | 8/2006 | Mintz et al. |
| 2007/0139769 | A1 | 7/2007 | DeCusatis et al. |
| 2007/0293299 | A1 | 12/2007 | Aida |
| 2008/0218854 | A1 | 9/2008 | Hoshino et al. |
| 2009/0312979 | A1 | 12/2009 | Pan |
| 2010/0007582 | A1 | 1/2010 | Zalewski |
| 2010/0195055 | A1 | 8/2010 | Maekawa |
| 2011/0199373 | A1 | 8/2011 | Liu |
| 2012/0146897 | A1 | 6/2012 | Yoshida et al. |
| 2012/0194419 | A1 | 8/2012 | Osterhout |
| 2012/0293941 | A1 | 11/2012 | Myerchin |
| 2013/0033650 | A1 | 2/2013 | Roberts |
| 2013/0050198 | A1 | 2/2013 | Song |
| 2013/0092805 | A1 | 4/2013 | Funk |
| 2013/0100126 | A1 | 4/2013 | Kim et al. |
| 2013/0100358 | A1 | 4/2013 | De Collibus |
| 2013/0343743 | A1 | 12/2013 | Yen |
| 2014/0091942 | A1 | 4/2014 | Matloff et al. |
| 2014/0118271 | A1 | 5/2014 | Lee |
| 2014/0307068 | A1 | 10/2014 | Song |
| 2015/0193084 | A1 | 7/2015 | Juni |
| 2015/0212718 | A1 | 7/2015 | Kellhammer |
| 2015/0288857 | A1 | 10/2015 | Fay |
| 2017/0009935 | A1 | 1/2017 | Theis et al. |
| 2017/0023911 | A1 | 1/2017 | Russell et al. |
| 2017/0038829 | A1 | 2/2017 | Lanier |
| 2017/0115488 | A1 | 4/2017 | Ambrus |
| 2017/0140791 | A1 | 5/2017 | Das et al. |
| 2017/0343804 | A1 | 11/2017 | Choi |
| 2018/0024373 | A1 | 1/2018 | Joseph |
| 2018/0224678 | A1 | 8/2018 | Jung |
| 2019/0156710 | A1 | 5/2019 | Hanson |

FOREIGN PATENT DOCUMENTS

| | | |
|---|---|---|
| JP | H9-238369 A | 9/1997 |
| JP | 2004-54150 A | 2/2004 |
| JP | 2005-221946 A | 8/2005 |
| JP | 2005-275398 A | 9/2005 |
| JP | 2010-273013 A | 12/2010 |

OTHER PUBLICATIONS

Hikechi Maeda, et al. "Experimental Development and Evaluation of All-Around Display System for Video Avatar in the Real World," *Proceedings of the Virtual Reality Society of Japan Annual Conference 8*, Sep. 3, 2003.

Horimai, Hideyoshi, et al. "Full-Color 3D Display System with 360 Degree Horizontal Viewing Angle." *Proc. Int. Symposium of 3D and Contents*, 2010. pp. 1-4.

File History of Related U.S. Appl. No. 15/888,896, filed Feb. 5, 2018, and titled "Floating Image Display System."

File History of Related U.S. Appl. No. 15/985,477, filed May 21, 2018, and titled "Electrical Charger For A Spinning Device."

File History of Related U.S. Appl. No. 15/985,502, filed May 21, 2018, and titled "Display of a Floating Image with Depth Enhancement."

File History of Related U.S. Appl. No. 15/983,006, filed May 17, 2018, and titled "Multi-Perspective Display of an Image."

File History of Related U.S. Appl. No. 16/011,505, filed Jun. 18, 2018, and titled "Image Display System With Visual Filter."

File History of Related U.S. Appl. No. 16/002,947, filed Jun. 7, 2018, and titled "Image Generation System Including A Spinning Display."

File History of Related U.S. Appl. No. 16/197,198, filed Nov. 20, 2018, and titled "Communication System Generating a Floating Image of a Remote Venue."

File History of Related U.S. Appl. No. 16/224,717, filed Dec. 18, 2018, and titled "Stereoscopic Image Display System."

File History of Related U.S. Appl. No. 16/547,283, filed Aug. 21, 2019, and titled "Methods and Systems of Displaying an Image Free of Motion-Blur Using Spinning Projectors."

File History of Related U.S. Appl. No. 16/532,243, filed Aug. 5, 2019, and titled "Image Generation Using a Spinning Display and Blur Screen."

\* cited by examiner

ROTATIONAL BLUR-FREE IMAGE GENERATION

BACKGROUND

Increases in computing power have made possible the generation of richly featured virtual characters capable of simulating interactivity. The illusion of interactivity may be even greater when the virtual character appears to an observer to be independent of the image generation system producing it. For example, a spinning display may be used to generate an apparently three-dimensional (3D) image that appears to float in space. However, blurring of the floating image due to rotation of the display used to produce it may be readily detectable to the eye of a human observer, and may undesirably reduce the immersiveness of the interactive experience for the observer.

SUMMARY

There are provided systems and methods for performing rotational blur-free image generation, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
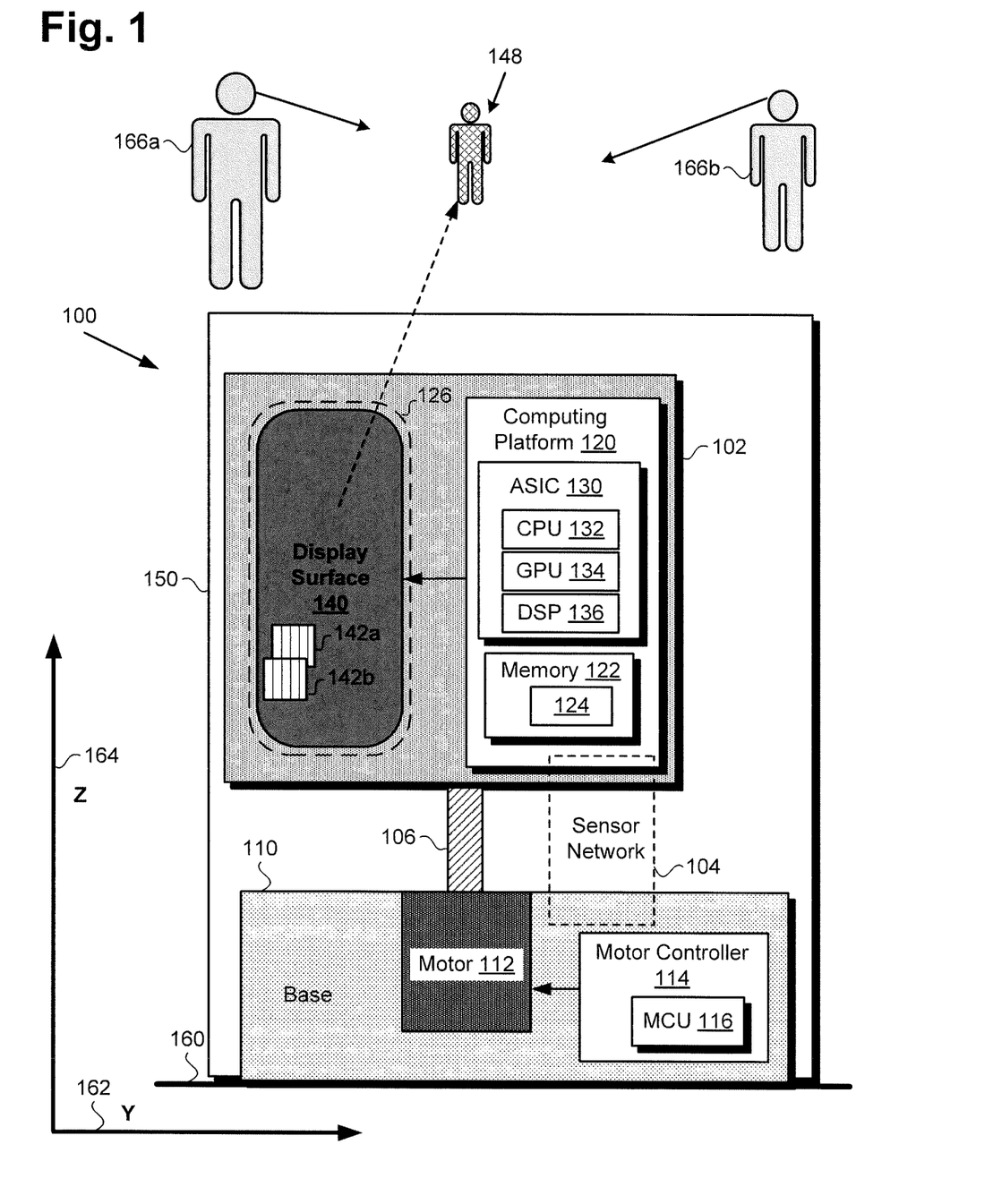
FIG. 1 shows a diagram of an exemplary image generation system including a spinning display, according to one implementation.

The present application discloses systems and methods for generating an image that is substantially free of rotational blur using a spinning display. FIG. 1 shows a diagram of exemplary image generation system 100, according to one implementation. As shown in FIG. 1, image generation system 100 includes display 102 configured to spin about an axis of rotation (axis of rotation not shown in FIG. 1). In addition, exemplary image generation system 100 includes stationary base 110 coupled to display 102 by rotor 106, and may further include masking shutter 150 surrounding at least display 102.

As further shown in FIG. 1, display 102 includes display surface 140, display aperture 126 through which an image displayed by display surface 140 can be viewed, and computing platform 120 communicatively coupled to display surface 140 so as to control display surface 140. Computing platform 120 includes application specific integrated circuit (ASIC) 130 including central processing unit (CPU) 132 implemented as a hardware processor, graphics processing unit (GPU) 134 also implemented as a hardware processor, and may further include digital signal processor (DSP) 136. Computing platform 120 also includes system memory 122 implemented as a non-transitory storage device storing software code 124.

Base 110 includes motor 112 for spinning rotor 106 and display 102, as well as motor controller circuit 114 including motor control unit (MCU) 116. Base 110 is situated on surface 160, which may be a floor or any other substantially horizontal surface. In addition, FIG. 1 shows horizontal axis 162 substantially parallel to surface 160 and designated herein as the "Y" axis, and vertical axis 164 substantially perpendicular to surface 160 and designated herein as the "Z" axis. Also shown in FIG. 1 are first privacy screen 142a situated at display surface 140, second privacy screen 142b situated between first privacy screen 142a and display aperture 126, sensor network 104 bridging base 110 and display 102, and image 148 displayed by display surface 140, as well as observers 166a and 166b viewing image 148 through display aperture 126, second privacy screen 142b, and first privacy screen 142a, from different perspectives.

By way of definition, as used in the present application, the terms "render" and "rendering" are defined to mean causing one or more images to appear on a display surface, such as display surface 140. Thus, rendering an image may mean causing an entirely new image to appear on the display surface, or refreshing an image previously appearing on the display surface. Moreover, as used in the present application, the terms "central processing unit" or "CPU" and "graphics processing unit" or "GPU" have their customary meaning in the art. That is to say, a CPU includes an Arithmetic Logic Unit (ALU) for carrying out the arithmetic and logical operations of computing platform 120, as well as a Control Unit (CU) for retrieving programs, such as software code 124, from system memory 122. A GPU is configured to reduce the processing overhead of the CPU by performing computationally intensive graphics processing tasks.

Sensor network 104 can include a base sensor unit integrated with base 110 and a rotating sensor unit integrated with display 102 and configured to rotate with display 102. According to one implementation, the base sensor unit may include one or more of an infrared (IR) light-emitting diode (LED), a magnet, a visible light LED, and a glyph or other visible marker, to name a few examples. The rotating sensor unit may include one or more of an IR receiver for sensing the IR LED, a Hall effect sensor for sensing the magnet, a photo diode for sensing the visible light LED, and one or more camera(s) for sensing the glyph or visible marker.

However, in another implementation, one or more of the IR LED, the magnet, the visible light LED, and the glyph or visible marker may be included in the rotating sensor unit, while one or more of the IR receiver, the Hall effect sensor, the photo diode, and the camera(s) may be included in the base sensor unit. It is noted that sensor unit 104 may be utilized to track the rotational position and/or spin rate of display 102. Moreover, the combination of computing platform 120 of display 102, sensor network 104, and motor controller circuit 114 of base 110 enable the necessary time synchronization between the revolutions per second (rps) of motor 112 and rotor 106, and the frame rate in frames per second (fps) at which display 102 renders images.

It is further noted that although FIG. 1 shows two observers 166a and 166b, that representation is provided merely for conceptual clarity. More generally, observers 166a and 166b may correspond to a single observer, or to more or many more than two observers who may be positioned so as to view image 148 from a variety of perspectives.

Figure 2:
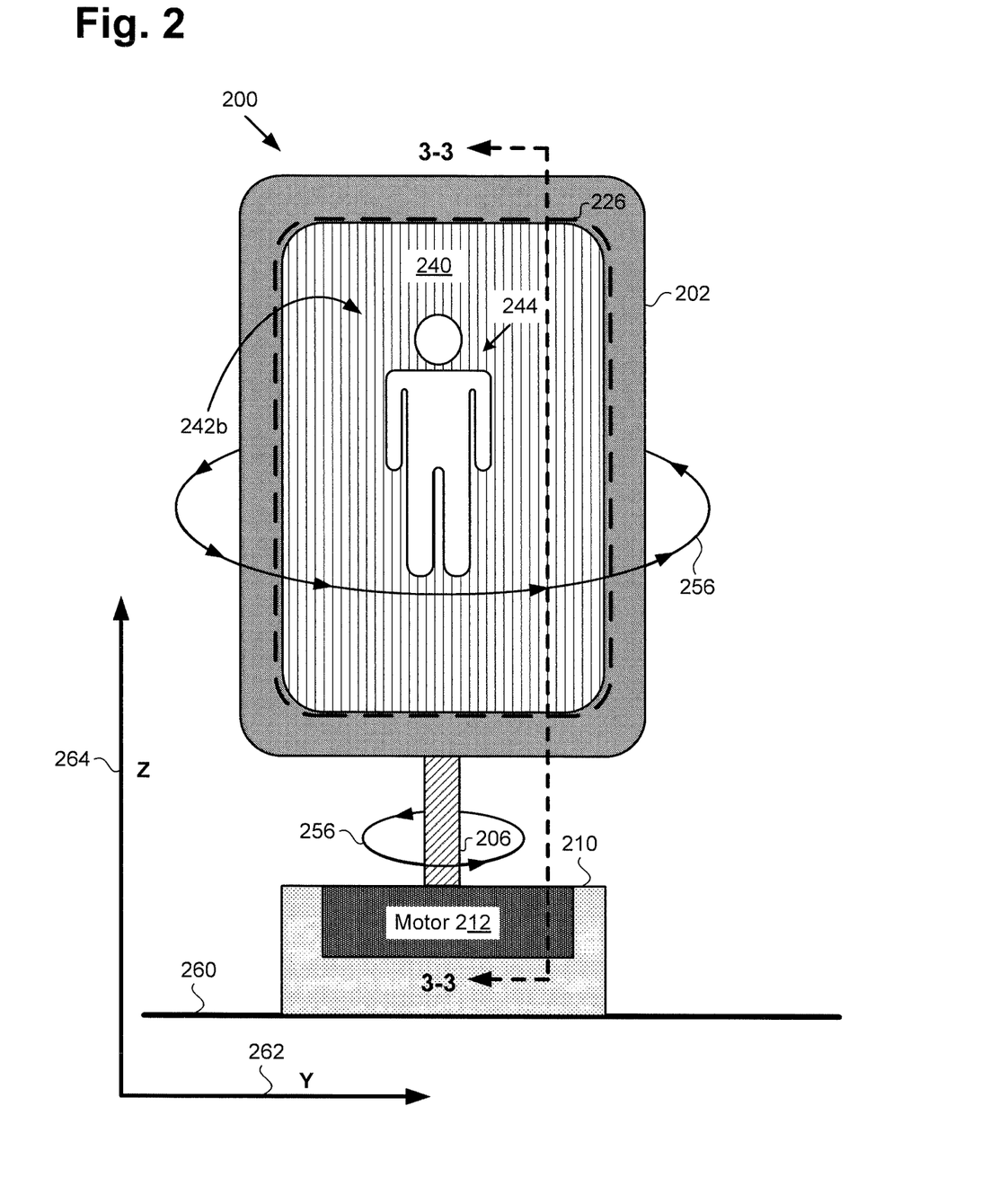
FIG. 2 shows a front view of an exemplary image generation system including a spinning display, according to one implementation.

FIG. 2 shows a front view of exemplary image generation system 200, according to one implementation. As shown in FIG. 2, image generation system 200 includes base 210 and display 202. Base 210 is shown to include motor 212 and to be situated on surface 260, which may be a floor or any other substantially horizontal surface. In addition, according to the exemplary implementation shown in FIG. 2, image generation system 200 includes rotor 206 securing display 202 to base 210.

Display 202 includes display surface 240 and display aperture 226 through which two-dimensional (2D) graphic 244 rendered on display surface 240 can be viewed. FIG. 2 further shows second privacy screen 242b. Also shown in FIG. 2 are horizontal Y axis 262 substantially parallel to surface 260, vertical Z axis 264 substantially perpendicular to surface 260, and spin direction 256 of rotor 206 and display 202.

Image generation system 200 corresponds in general to image generation system 100, in FIG. 1. As a result, image generation system 200 may share any of the characteristics attributed to image generation system 100 by the present disclosure, and vice versa. In addition, rotor 206 and base 210 including motor 212, correspond respectively in general to rotor 106 and base 110 including motor 112, in FIG. 1. Thus, rotor 206, base 210, and motor 212, may share any of the characteristics attributed to respective rotor 106, base 110, and motor 112, by the present disclosure, and vice versa. That is to say, although not explicitly shown in FIG. 2, base 210 includes features corresponding respectively to motor controller circuit 114 and MCU 116.

Moreover, display 202 including display aperture 226 and display surface 240 corresponds in general to display 102 including display aperture 126 and display surface 140, in FIG. 1. Thus, display 202, display aperture 226, and display surface 240 may share any of the characteristics attributed to respective display 102, display aperture 126, and display surface 140 by the present disclosure, and vice versa. That is to say, although not explicitly identified in FIG. 2, display 202 includes a first privacy screen corresponding in general to first privacy screen 142a, in FIG. 1, and situated between display surface 240 and second privacy screen 242b. Moreover, and although also not explicitly shown in FIG. 2, display 202 may include features corresponding respectively to computing platform 120 including ASIC 130 having CPU 132, GPU 134, and DSP 136, and further including system memory 122 storing software code 124.

It is noted that second privacy screen 242b, in FIG. 2, corresponds in general to second privacy screen 142b, in FIG. 1. As a result, second privacy screen 242b may share any of the characteristics attributed to corresponding second privacy screen 142b by the present disclosure, and vice versa.

Figure 3:
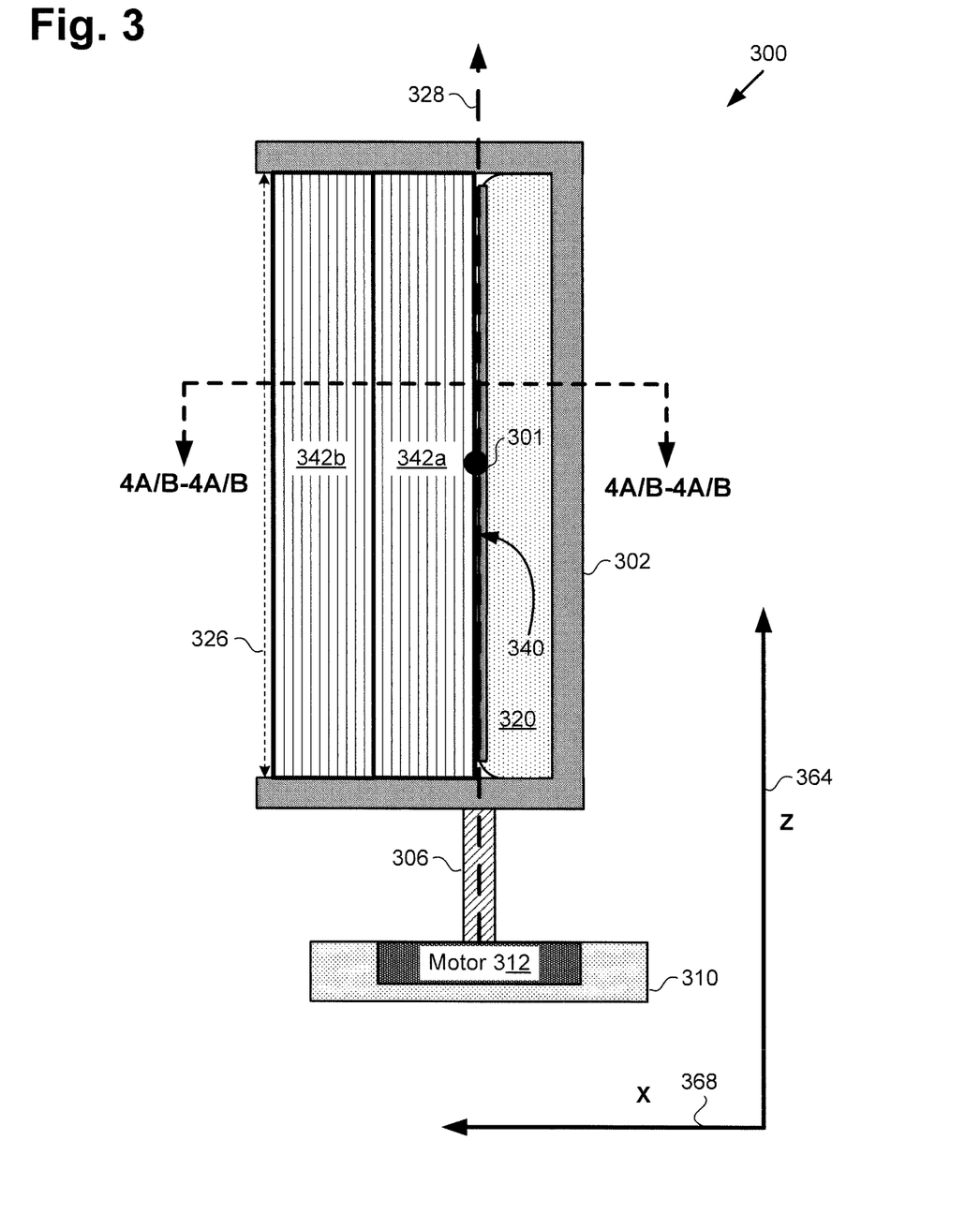
FIG. 3 shows a cross-sectional side view of a portion of the exemplary image generation system shown in FIG. 2.

FIG. 3 shows a cross-sectional side view of exemplary image generation system 300 along perspective lines 3-3 in FIG. 2, according to one implementation. As shown in FIG. 3, image generation system 300 includes base 310 and display 302. Base 310 is shown to include motor 312. In addition, according to the exemplary implementation shown in FIG. 3, image generation system 300 includes rotor 306 securing display 302 to base 310.

Display 302 includes display surface 340 controlled by computing platform 320, display aperture 326 through which an image displayed by display surface 340 can be viewed, first privacy screen 342a situated at display surface 340, and second privacy screen 342b situated between first privacy screen 342a and display aperture 326. Also shown in FIG. 3 are horizontal X axis 368 normal to display surface 340 and perpendicular to horizontal Y axis 162/262 in FIGS. 1 and 2, vertical Z axis 364, axis of rotation 328 of rotor 306 and display 302, and center of mass 301 of display 302.

Image generation system 300 corresponds in general to image generation system 100/200, in FIGS. 1 and 2. As a result, image generation system 300 may share any of the characteristics attributed to image generation system 100/200 by the present disclosure, and vice versa. In addition, rotor 306 and base 310 including motor 312, correspond respectively in general to rotor 106/206 and base 110/210 including motor 112/212, in FIGS. 1 and 2. Thus, rotor 306, base 310, and motor 312, may share any of the characteristics attributed to respective rotor 106/206, base 110/210, and motor 112/212, by the present disclosure, and vice versa. That is to say, although not explicitly shown in FIG. 3, base 310 includes features corresponding respectively to motor controller circuit 114 and MCU 116.

Moreover, display 302 including display aperture 326 and display surface 340 corresponds in general to display 102/202 including display aperture 126/226 and display surface 140/240, in FIGS. 1 and 2. Thus, display 302, display aperture 326, and display surface 340 may share any of the characteristics attributed to respective display 102/202, display aperture 126/226, and display surface 140/240 by the present disclosure, and vice versa. In addition, first privacy screen 342a, in FIG. 3, corresponds in general to first privacy screen 142a, in FIG. 1, while second privacy screen 342b corresponds in general to second privacy screen 142b/242b, in FIGS. 1 and 2. As a result, first privacy screen 342a may share any of the characteristics attributed to corresponding first privacy screen 142a by the present disclosure, and vice versa. Moreover, second privacy screen 342b may share any of the characteristics attributed to corresponding second privacy screen 142b/242b by the present disclosure, and vice versa.

Computing platform 320 of display 302 corresponds in general to computing platform 102, in FIG. 1. Consequently, and although also not explicitly shown in FIG. 3, computing platform 320 of display 302 may include features corresponding respectively to ASIC 130 having CPU 132, GPU 134, and DSP 136, and further including system memory 122 storing software code 124.

As shown in FIG. 3, display surface 140/240/340 of display 102/202/302 may be situated on axis of rotation 328 of rotor 106/206/306 and display 102/202/302. For example, in some implementations, display surface 140/240/340 may be precisely aligned so as to be on axis of rotation 328 and so as to be centered on axis of rotation 328. As further shown in FIG. 3, center of mass 301 of display 102/202/302 may also be situated on axis of rotation 328 of rotor 106/206/306 and display 102/202/302.

First privacy screen 142a/342a and second privacy screen 142b/242b/342b may be implemented using any suitable materials configured to restrict the lateral angles from which display surface 140/240/340 may be viewed. It is noted that, as defined in the present application, the term "lateral viewing angle" refers to the angular deviation from X axis 368 in the plane defined by X axis 368 and Y axis 162/262 from which an image rendered by display surface 140/240/340 may be viewed by an observer of image generation system 100/200/300, such as observers 166a and 166b.

By way of example, first privacy screen 142a/342a and second privacy screen 142b/242b/342b may each be formed of a pliable polymer material, a thermoplastic, or a thermoset material. As specific but non-limiting examples, one or both of first privacy screen 142a/342a and second privacy screen 142b/242b/342b may include one or more of polycarbonate, acrylic, and polyethylene.

In some implementations, first privacy screen 142a/342a and second privacy screen 142b/242b/342b may be implemented using a commercially available privacy film typically used as a substantially flat sheet covering the surface of a computer monitor. Imposing a curvature on such a commercially available privacy film may further restrict the viewing angles it allows. For instance, a commercially available privacy film permitting a sixty degree viewing angle when implemented as a substantially flat screen may restrict the viewing angle to less than sixty degrees, or even significantly less than sixty degrees, when curved. Moreover, the additional viewing restriction imposed by curving such a material may increase as the curvature imposed on the material is increased.

Thus, first privacy screen 142a/342a has a first curvature with respect to light emitted from display surface 140/240/340, while second privacy screen 142b/242b/342b has a second curvature with respect to light emitted from display surface 140/240/340. Moreover, including first privacy screen 142a/342a having a first curvature with respect to light emitted from display surface 140/240/340 and second privacy screen 142b/242b/342b having a second curvature with respect to light emitted from display surface 140/240/340 as components of display 102/202/302 substantially prevents rotational blur of image 148 displayed by display surface 140/240/340 while display 102/202/302 is spinning.

Figure 4A:
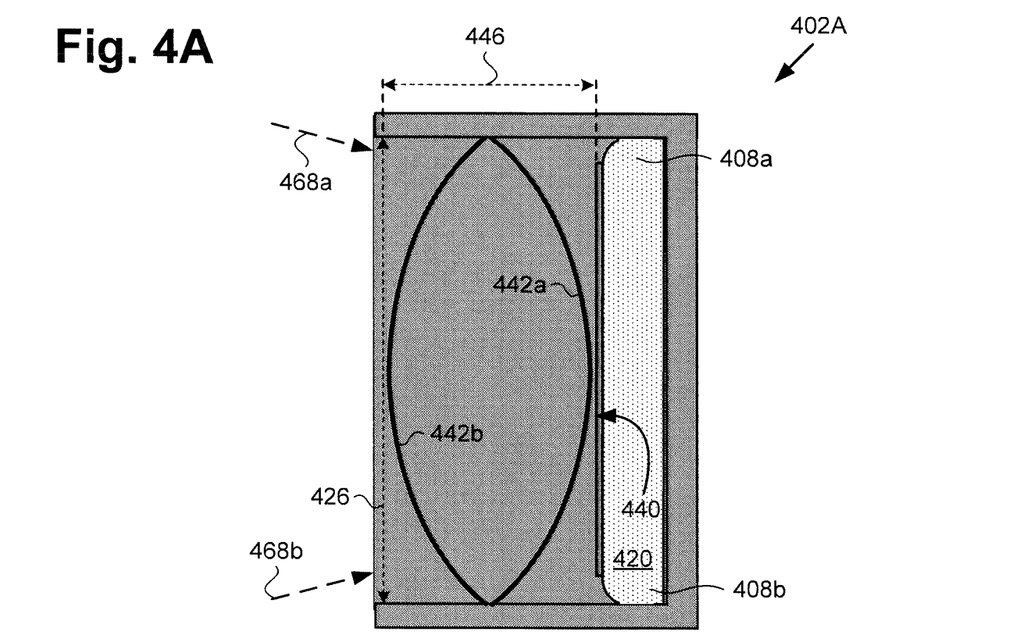
FIG. 4A shows a cross-sectional top view of one exemplary implementation of a display suitable for use in the image generation system shown in FIGS. 1, 2, and 3.
Figure 4B:
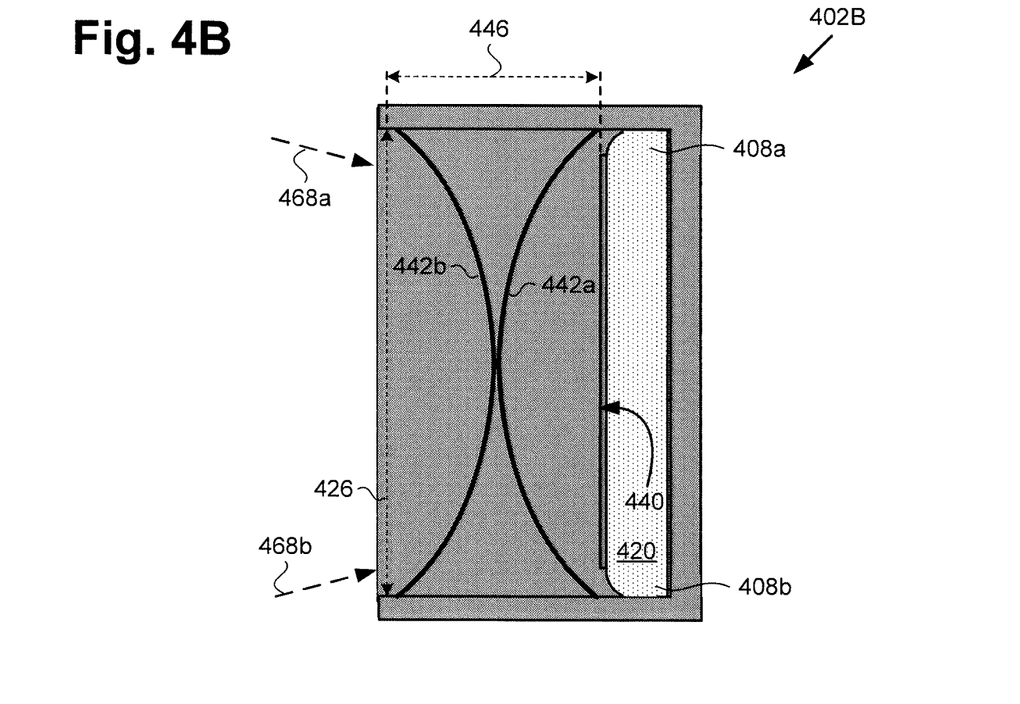
FIG. 4B shows a cross-sectional top view of another exemplary implementation of a display suitable for use in the image generation system shown in FIGS. 1, 2, and 3.

FIG. 4A shows a cross-sectional top view of display 402A along perspective lines 4A/B-4A/B in FIG. 3, according to one exemplary implementation, while FIG. 4B shows a cross-sectional top view of display 402B along perspective lines 4A/B-4A/B, according to another exemplary implementation. Each of displays 402A and 402B is shown to include display aperture 426 and display surface 440 controlled by computing platform 420, as well as first privacy screen 442a having a first curvature and second privacy screen 442b having a second curvature.

FIGS. 4A and 4B also show viewing angle 468a at lateral side 408a of display surface 440, viewing angle 468b at lateral side 408b of display surface 440, and distance 446 between aperture 426 and display surface 440. It is noted that either of viewing angles 468a and 468b may be referred to as a first viewing angle or a second viewing angle, while either of lateral sides 408a and 408b of display surface 440 may be referred to as a first lateral side or a second lateral side. It is further noted that distance 446 may be a distance of less than or approximately equal to twenty-five millimeters (25 mm), for example, such as a distance in a range from approximately 10 mm to approximately 25 mm.

Each of displays 402A and 402B can correspond in general to display 102/202/302 in FIGS. 1, 2, and 3. As a result, display 102/202/302 may share any of the characteristics attributed to either of displays 402A and 402B by the present disclosure, and vice versa. In addition, display aperture 426, display surface 440, and second privacy screen 442b correspond respectively in general to display aperture 126/226/326, display surface 140/240/340, and second privacy screen 142b/242b/342b, in FIGS. 1, 2, and 3. Furthermore, computing platform 420 and first privacy screen 442a, in FIGS. 4A and 4B, correspond respectively in general to computing platform 120/320 and first privacy screen 142a/342a, in FIGS. 1 and 3.

As shown in FIGS. 4A and 4B, the first and second curvatures of respective first privacy screen 142a/342a/442a and second privacy screen 142b/242b/342b/442b may be substantially opposite. For example, as shown in FIG. 4A, the first curvature of first privacy screen 142a/342a/442a may be convex with respect to light emitted from display surface 140/240/340/440, while the second curvature of second privacy screen 142b/242b/342b/442b may be concave with respect to light emitted from display surface 140/240/340/440. Alternatively, and as shown by FIG. 4B, the first curvature of first privacy screen 142a/342a/442a may be concave with respect to light emitted from display surface 140/240/340/440, while the second curvature of second privacy screen 142b/242b/342b may be convex with respect to light emitted from display surface 140/240/340.

Figure 5:
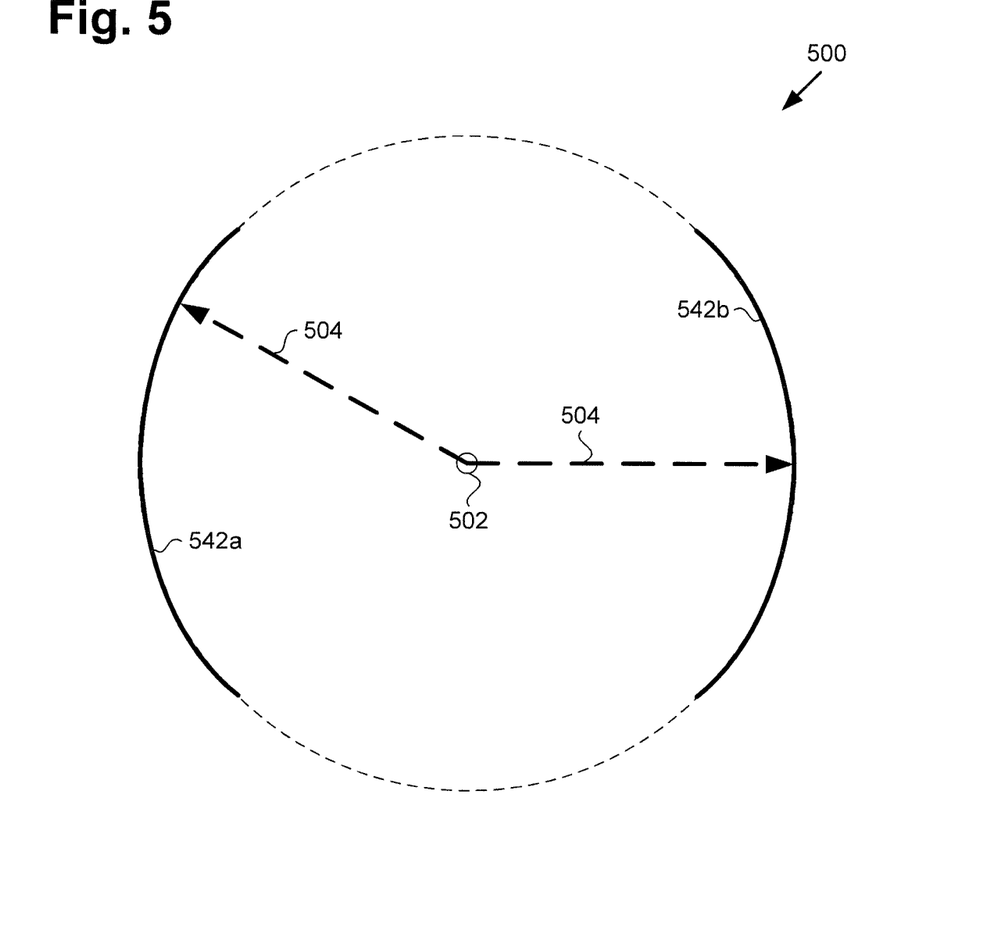
FIG. 5 shows a diagram depicting a radius of curvature of each of first and second privacy screens suitable for use in the image generation systems of FIGS. 1, 2, and 3.

FIG. 5 shows a diagram depicting a radius of curvature of each of first and second privacy screens 542a and 542b suitable for use in the image generation systems of FIGS. 1, 2, and 3. As shown in FIG. 5, circle 500 includes center of curvature 502, and first and second privacy screens 542a and 542b depicted as circular arcs of circle 500. Also shown in FIG. 5 is radius of curvature 504 of each of first and second privacy screens 542a and 542b.

It is noted that first privacy screen 542a corresponds in general to first privacy screen 142a/342a/442a, in FIGS. 1, 3, 4A, and 4B, and each of those features may share the characteristics attributed to any of those corresponding features by the present disclosure. In addition, second privacy screen 542b, in FIG. 5, corresponds in general to second privacy screen 142b/242b/342b/442b, in FIGS. 1, 2, 3, 4A, and 4B, and each of those features may share the characteristics attributed to any of those corresponding features by the present disclosure.

As known in the art, "curvature" is the inverse of radius of curvature. In other words, the larger the radius of curvature of a circular arc, the smaller its curvature. As shown by FIG. 5, in one implementation, first privacy screen 142a/342a/442a/542a and second privacy screen 142b/242b/342b/442b/542b may have substantially the same radius of curvature 504. Thus, in that implementation, the magnitude of first curvature of first privacy screen 142a/342a/442a/542a substantially equals the magnitude of second curvature of second privacy screen 142b/242b/342b/442b/542b. Moreover, and as shown by FIGS. 4A and 4B, the first curvature of first privacy screen 142a/342a/442a/542a may be substantially opposite the second curvature of second privacy screen 142b/242b/342b/442b/542b. That is to say, in implementations in which first privacy screen 142a/342a/442a/542a is convex with respect to light emitted from display surface 140/240/340/440, second privacy screen 142*b*/242*b*/342*b*/442*b*/542*b* may be concave with respect to light emitted from display surface 140/240/340/440, and vice versa.

Referring to FIGS. 1, 2, 3, 4A, and 4B in combination, display surface 140/240/340/440 may be controlled by CPU 132 and/or GPU 134 of ASIC 130, while rotor 106/206/306 coupled to display 102/202/302/402A/402B is controlled by CPU 132 of ASIC 130. CPU 132 of ASIC 130 is configured to execute software code 124 to render 2D graphic 244 on display surface 140/240/340/440.

CPU 132 is further configured to execute software code 124 to utilize motor 112/212/312 to spin rotor 106/206/306 and display 102/202/302/402A/402B about axis of rotation 328 at a predetermined spin rate to generate image 148 corresponding to 2D graphic 244. As a result of the image generation performed by spinning of display 102/202/302/402A,402B, image 148 may appear to be floating in space, and may appear to be a three-dimensional (3D) floating image corresponding to 2D graphic 244 rendered on display surface 140/240/340/440.

In some implementations, display surface 140/240/340/440 may be a liquid crystal display (LCD) screen, or an organic light-emitting diode (OLED) display screen, for example. Moreover, in some implementations, display surface 140/240/340/440 may be part of a mobile communication device serving as computing platform 120/320/420, the mobile communication device being integrated with display 102/202/302/402A/402B, and being configured to spin with rotor 106/206/306 and display 102/202/302/402A/402B at the predetermined spin rate. For example, display surface 140/240/340/440 may be part of a smartphone or a tablet computer providing computing platform 120/320/420.

It is noted that CPU 132 may execute software code 124 to control motor 112/212/312 in order to spin rotor 106/206/306 and display 102/202/302/402A/402B about axis of rotation 328 at a varying spin rate, or at a substantially constant predetermined spin rate. It is also noted that spin direction 256 may be in either a counter clockwise direction with respect to the plane of horizontal X axis 368 and Y axis 162/262, as shown in FIG. 2, or in a clockwise direction with respect to that plane.

In some implementations, CPU 132 may execute software code 124 to use GPU 134 to change 2D graphic 244 as rotor 106/206/306 and display 102/202/302/402A/402B spin, so as to generate multiple perspectives of image 148 that are appropriate respectively to the locations of each of observers 166*a* and 166*b*. For example, observer 166*a* located so as to face a front side of image 148 and stationary at that location might consistently view image 148 from a frontal perspective. By contrast, observer 166*b* located so as to face a backside of image 148, i.e., 180° apart from the perspective of observer 166*a*, and stationary at that location might consistently view image 148 as if from the rear.

In some use cases, it may be advantageous or desirable to enhance the illusion that image 148 is floating in space independently of display 102/202/302/402A/402B. When implemented for those use cases, display 102/202/302/402A/402B may be surrounded by masking shutter 150. Masking shutter 150 may be implemented as a liquid-crystal shutter, such as a polymer-dispersed liquid-crystal (PDLC), or "smart glass" shutter, for example. Alternatively, masking shutter 150 may be implemented using any suitable electrochromic, photochromic, or thermochromic material. For example, in one implementation, masking shutter 150 may be implemented as a suspended-particle device (SPD), while in another implementation, masking shutter 150 may be implemented using a material that changes transparency in response to exposure to ultraviolet (UV) light.

Figure 6:
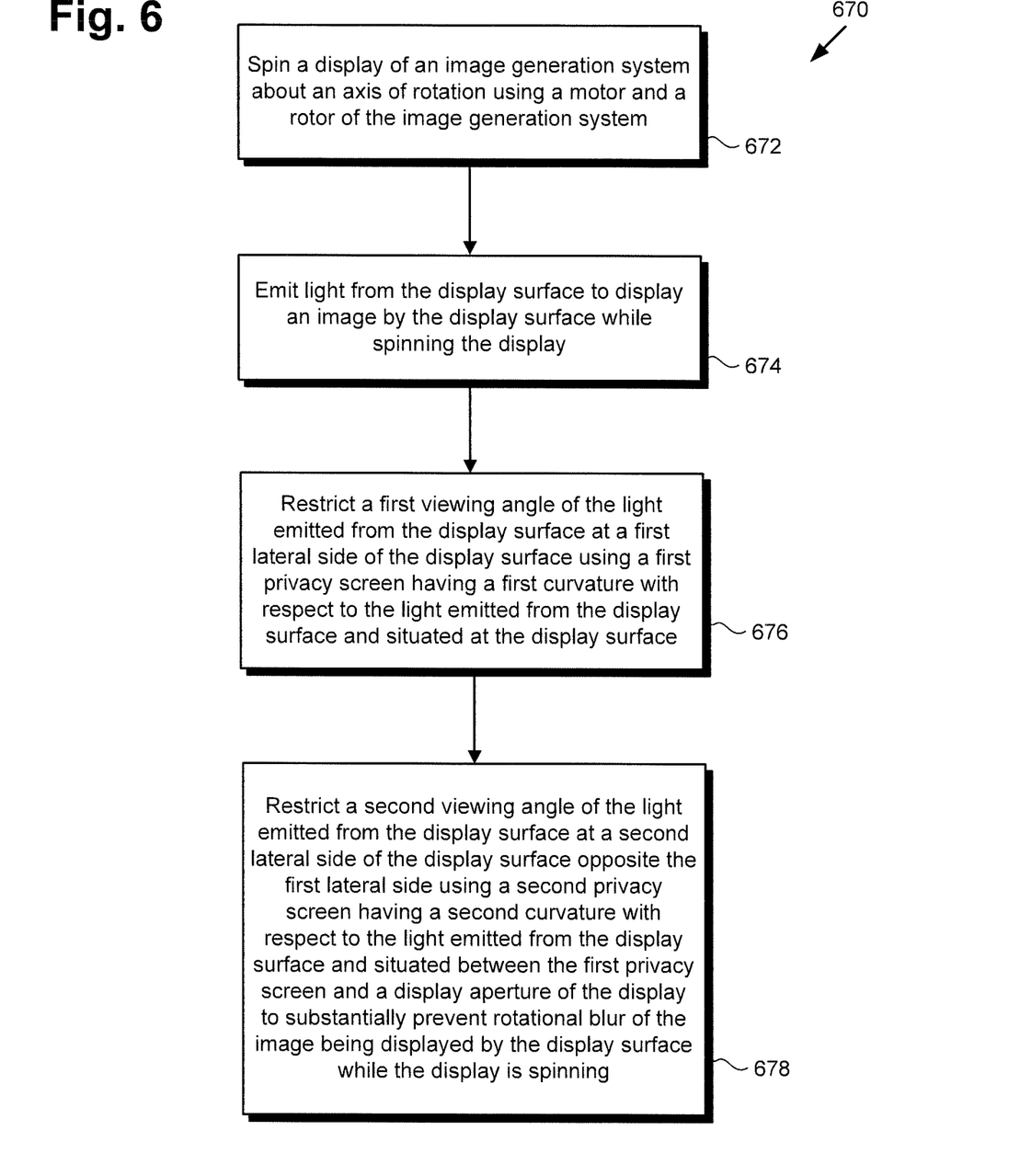
FIG. 6 shows a flowchart outlining an exemplary method for generating an image that is substantially free of rotational blur using a spinning display, according to one implementation.

The functionality of image generation system 100/200/300 including display 102/202/302/402A/402B configured to spin will be further described by reference to FIG. 6. FIG. 6 shows flowchart 670 outlining an exemplary method for generating an image that is substantially free of rotational blur using a spinning display, according to one implementation. With respect to the method described by FIG. 6, it is noted that certain details and features have been left out of flowchart 670 in order not to obscure the discussion of the inventive features in the present application.

Referring to FIG. 6 in combination with FIGS. 1, 2, 3, 4A, and 4B, flowchart 670 begins with spinning display 102/202/302/402A/402B about axis of rotation 328 using motor 112/212/312 and rotor 106/206/306 (action 672). As noted above, spinning of display 102/202/302/402A/402B about axis of rotation 328 may be performed using motor 112/212/312 and rotor 106/206/306 under the control of software code 124, executed by CPU 132 of ASIC 130, and using a predetermined spin rate or a variable spin rate.

Flowchart 670 continues with emitting light from display surface 140/240/340/440 to display image 148 by display surface 140/240/340/440 while spinning display 102/202/302/402A/402B (action 674). Emission of light from display surface 140/240/340/440 to display image 148 may be performed by software code 124, executed by CPU 132 of ASIC 130, and may include use of GPU 134. As noted above, as a result of the image generation performed by spinning of display 102/202/302/402A/402B, image 148 may appear to be a 3D image corresponding to 2D graphic 244 rendered on display surface 140/240/340/440. Furthermore, image 148 may appear to be a 3D image floating in space.

Referring to FIG. 5 in combination with FIGS. 1, 2, 3, 4A, and 4B, flowchart 670 continues with restricting first viewing angle 468*a*/468*b* of the light emitted from display surface 140/240/340/440 at first lateral side 408*a*/408*b* of display surface 140/240/340/440 using first privacy screen 142*a*/342*a*/442*a*/542*a* having a first curvature with respect to the light emitted from display surface 140/240/340/440 and situated at display surface 140/240/340/440 (action 676). As shown by FIG. 4A, in some implementations, first privacy screen 142*a*/342*a*/442*a*/542*a* may be convex with respect to light emitted from display surface 140/240/340/440. As further shown by FIG. 4B, in other implementations, first privacy screen 142*a*/342*a*/442*a*/542*a* may be concave with respect to light emitted from display surface 140/240/340/440.

Flowchart 670 can conclude with restricting second viewing angle 468*b*/468*a* of the light emitted from display surface 140/240/340/440 at second lateral side 408*b*/408*a* of display surface 140/240/340/440 opposite first lateral side 408*a*/408*b* using second privacy screen 142*b*/242*b*/342*b*/442*b*/542*b* having a second curvature with respect to the light emitted from display surface 140/240/340/440 and situated between first privacy screen 142*a*/342*a*/442*a*/542*a* and display aperture 126/226/326/426 to substantially prevent rotational blur of image 148 being displayed by display surface 140/240/340/440 while display 102/202/302/402A/402B is spinning (action 678).

As shown by FIG. 4A, in implementations in which first privacy screen 142*a*/342*a*/442*a*/542*a* is convex with respect to light emitted from display surface 140/240/340/440, second privacy screen 142*b*/242*b*/342*b*/442*b*/542*b* may be concave with respect to light emitted from display surface 140/240/340/440. As further shown by FIG. 4B, in implementations in which first privacy screen 142*a*/342*a*/442*a*/542*a* is concave with respect to light emitted from display surface 140/240/340/440, second privacy screen 142*b*/242*b*/342*b*/442*b*/542*b* may be convex with respect to light emitted from display surface 140/240/340/440.

It is noted that depending on its curvature, i.e., convex or concave, and the direction of rotation of rotor 106/206/306 and display 102/202/302/402A/402B, first privacy screen 142*a*/342*a*/442*a*/542*a* can substantially prevent rotational blur of image 148 being displayed by display surface 140/240/340/440 at one of first lateral side 408*a*/408*b* and second lateral side 408*b*/408*a* while display 102/202/302/402A/402B is spinning. When second privacy screen 142*b*/242*b*/342*b*/442*b*/542*b* has the opposite curvature, i.e., concave or convex, second privacy screen 142*b*/242*b*/342*b*/442*b*/542*b* can substantially prevent rotational blur of image 148 being displayed by display surface 140/240/340/440 at the opposite of first lateral side 408*a*/408*b* and second lateral side 408*b*/408*a* while display 102/202/302/402A/402B is spinning.

Thus, use of first privacy screen 142*a*/342*a*/442*a*/542*a* and second privacy screen 142*b*/242*b*/342*b*/442*b*/542*b*, in combination, can substantially prevent rotational blur of image 148 while display 102/202/302/402A/402B is spinning. That is to say, first privacy screen 142*a*/342*a*/442*a*/542*a* and second privacy screen 142*b*/242*b*/342*b*/442*b*/542*b*, when implemented together, can advantageously render rotational blur of image 148 generated by spinning display 102/202/302/402A/402B substantially imperceptible to observers 166*a* and 166*b*.

As described above, the present application discloses systems and methods for generating an image that is substantially free of rotational blur using a spinning display. By rendering a 2D graphic on a display surface of a display and spinning the display using a motor and a rotor, the systems and methods disclosed by the present application enable the generation of an apparently 3D floating image corresponding to the 2D graphic. Moreover, by utilizing first and second oppositely curved privacy screens to restrict viewing angles at opposite lateral sides of the display surface, the present solution advantageously enables generation of the 3D image having no perceptible rotational blur.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image generation system comprising:
   a base including a rotor and a motor for spinning the rotor about an axis of rotation;
   a display secured to the rotor, wherein the display includes a display surface and a display aperture;
   a first privacy screen situated at the display surface, the first privacy screen having a convex curvature relative to light emitted from the display surface;
   a second privacy screen situated between the first privacy screen and the display aperture, the second privacy screen having a concave curvature relative to light emitted from the display surface;
   wherein the first privacy screen and the second privacy screen are configured to substantially prevent rotational blur of an image displayed by the display surface while the display is spun by the motor and the rotor.

2. The image generation system of claim 1, wherein the display surface is on the axis of rotation.

3. The image generation system of claim 1, wherein a radius of curvature of the first privacy screen and a radius of curvature of the second privacy screen are substantially the same.

4. The image generation system of claim 1, wherein the first privacy screen and the second privacy screen comprise at least one of polycarbonate, acrylic, and polyethylene.

5. The image generation system of claim 1, wherein the image displayed by the display surface is rendered as a two-dimensional (2D) graphic on the display surface, and wherein spinning the display by the motor and the rotor causes the rendered 2D graphic to appear as a three-dimensional (3D) floating image.

6. The image generation system of claim 1, wherein the display surface is part of a mobile communication device configured to spin with the display.

7. An image generation system comprising:
   a base including a rotor and a motor for spinning the rotor about an axis of rotation;
   a display secured to the rotor, wherein the display includes a display surface and a display aperture;
   a first privacy screen situated at the display surface, the first privacy screen having a concave curvature relative to light emitted from the display surface;
   a second privacy screen situated between the first privacy screen and the display aperture, the second privacy screen having a convex curvature relative to light emitted from the display surface;
   wherein the first privacy screen and the second privacy screen are configured to substantially prevent rotational blur of an image displayed by the display surface while the display is spun by the motor and the rotor.

8. The image generation system of claim 7, wherein the display surface is on the axis of rotation.

9. The image generation system of claim 7, wherein a radius of curvature of the first privacy screen and a radius of curvature of the second privacy screen are substantially the same.

10. The image generation system of claim 7, wherein the first privacy screen and the second privacy screen comprise at least one of polycarbonate, acrylic, and polyethylene.

11. The image generation system of claim 7, wherein the image displayed by the display surface is rendered as a two-dimensional (2D) graphic on the display surface, and wherein spinning the display by the motor and the rotor causes the rendered 2D graphic to appear as a three-dimensional (3D) floating image.

12. The image generation system of claim 7, wherein the display surface is part of a mobile communication device configured to spin with the display.

13. A method for use by an image generation system having a base including a rotor and a motor for spinning the rotor about an axis of rotation, a display secured to the rotor, wherein the display includes a display surface and a display aperture, a first privacy screen situated at the display surface, the first privacy screen having a first curvature relative to light emitted from the display surface, and a second privacy screen situated between the first privacy screen and the display aperture, the second privacy screen having a second curvature relative to light emitted from the display surface, the method comprising:

spinning the display, using the motor and the rotor, about the axis of rotation;

emitting light from the display surface to display an image while spinning the display;

restricting a first viewing angle of the light emitted from the display surface at a first lateral side of the display surface using the first privacy screen having the first curvature; and     restricting a second viewing angle of the light emitted from the display surface at a second lateral side of the display surface opposite the first lateral side using the second privacy screen having the second curvature to substantially prevent rotational blur of the image being displayed by the display surface while the display is spinning.

14. The method of claim 13, wherein the first curvature is convex relative to light emitted from the display surface and wherein the second curvature is concave relative to light emitted from the display surface.

15. The method of claim 13, wherein the first curvature is concave relative to light emitted from the display surface and wherein the second curvature is convex relative to light emitted from the display surface.

16. The method of claim 13, wherein the display surface is on the axis of rotation.

17. The method of claim 13, wherein a radius of curvature of the first privacy screen and a radius of curvature of the second privacy screen are substantially the same.

18. The method of claim 13, wherein the first privacy screen and the second privacy screen comprise at least one of polycarbonate, acrylic, and polyethylene.

19. The method of claim 13, wherein the image displayed by the display surface is rendered as a two-dimensional (2D) graphic on the display surface, and wherein spinning the display by the motor and the rotor causes the rendered 2D graphic to appear as a three-dimensional (3D) floating image.

20. The method of claim 13, wherein the display surface is part of a mobile communication device configured to spin with the display.

\* \* \* \* \*